May 30, 1933.  A. ROZWORA  1,911,244

TRACTION INCREASING DEVICE

Filed April 26, 1930

Inventor
Anthony Rozwora.
By Bryant & Lowry
Attorneys

Patented May 30, 1933

1,911,244

UNITED STATES PATENT OFFICE

ANTHONY ROZWORA, OF NEW MILFORD, CONNECTICUT

TRACTION INCREASING DEVICE

Application filed April 26, 1930. Serial No. 447,627.

This invention relates to traction increasing devices adapted to be supplementarily attached to the wheel of a vehicle.

The primary object of this invention, is to provide a device of the above mentioned character which may be attached to a vehicle wheel such as the present day motor car wheel whereby the attachment will not interfere with the free running of the balloon or pneumatic tire.

A still further object of this invention, is to provide a supplemental wheel attachment having means for securing the frame to the spokes of the wheel whereby easy removal of the wheel attachment or traction increasing device may be accomplished.

A still further object of this invention, is to provide a device constituting a supplemental wheel traction increasing device formed of comparatively few parts which are simple and easy in construction.

Heretofore, it has been common practice to provide pneumatically tired vehicle wheels with anti-skid chains which extend across the tread of the tire and supposedly increase traction through snow, slush etc. This practice is objectionable, due to the fact that the cross chains of the anti-skid devices cause undue wear upon the tread of the tire and also wear until the chain becomes very thin whereupon breakage is in order.

The above disadvantages are overcome by providing a traction receiving device adapted to be carried by the spokes of the vehicle wheel whereby the traction increasing lugs do not extend beyond the periphery or tread of the pneumatic tire on the wheel. Also, due to the fact that the traction increasing device does not in any way or manner engage the pneumatic tire, it will be readily observed that wearing of the tire will not ensue.

Other objects and advantages of the invention will become apparent during the course of the following description, forming a part of this specification and in which like reference characters are employed to designate like parts throughout the same and in which, Figure 1 is a side elevational view of the invention, illustrating the supplemental wheel attachment secured in place upon the vehicle wheel;

Figure 1:
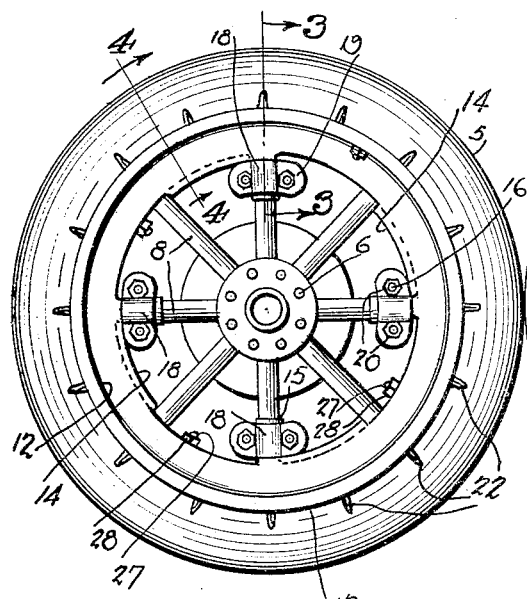

In the drawing, wherein for the purpose of illustration is shown a preferred embodiment of this invention, the reference character 5 will generally be employed to designate a pneumatically tired wheel, having a hub 6, felloe 7 and connecting spokes 8. This structure constitutes a present day wheel as used on motor cars and carries a demountable rim 9 for the pneumatic tire 10.

Figure 2:
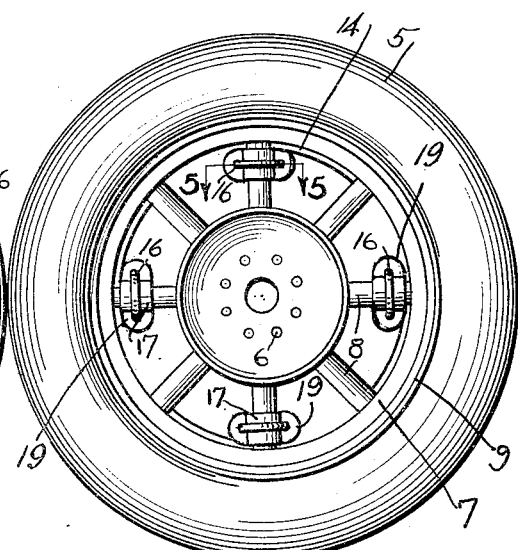
Figure 2 is a rear elevational view showing the pneumatically tired wheel and the clamp for holding the wheel attachment in place.
Figure 3:
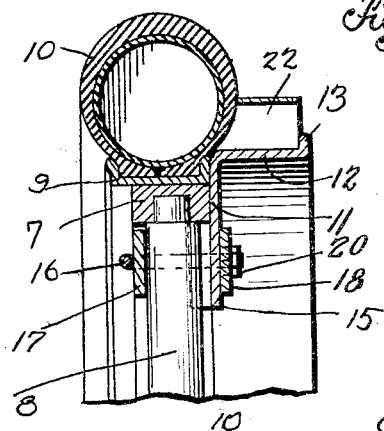
Figure 3 is a cross-sectional view taken on line 3—3 of Figure 1, illustrating the manner in which the traction increasing device is rigidly attached to the spokes of the wheel.
Figure 5:
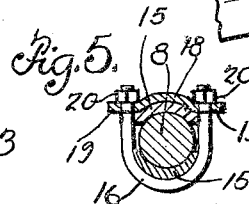
Figure 5 is a cross-sectional view through one of the spokes on line 5—5 of Figure 2, illustrating the clamping bolt which passes around the spoke and secures the supplemental wheel attachment in place.
Figures 6, 8:
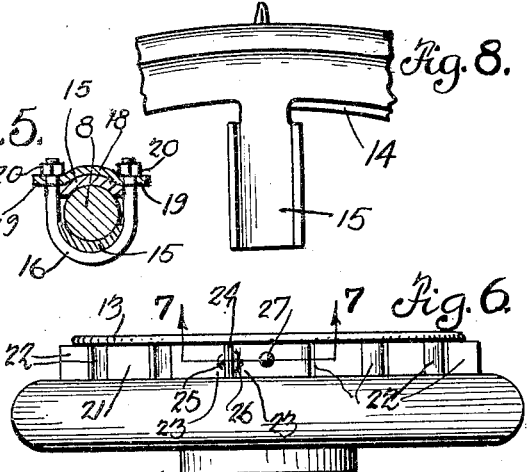
Figure 6 is a top elevational view of the invention illustrating the manner in which the supplemental wheel attachment is secured to the pneumatic tired wheel.
Figure 8 is an enlarged detail view of the felloe embracing rim and one of the holding tongues.
Figure 4:
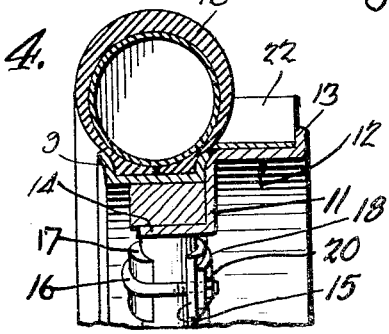
Figure 4 is a cross-sectional view taken on line 4—4 of Fig. 1 illustrating the traction increasing wheel and the flange thereof for embracing the felloe.

The invention comprises a circular ring 11 adapted to lie flush with the side wall of the felloe 7 clearly illustrated in Figures 3 and 4. An extension 12 is formed on the circumferential ring 11 and extends at right angles thereto terminating in a flanged edge 13. At spaced intervals on the circumferential ring 11 is a series of inturned lips 14 which extend between the spokes 8 and which embrace the felloe 7 whereby the circumferential ring 11 may be held from rotation relative to the wheel 5. Also formed integral with the ring 11 at spaced intervals thereon is an inwardly extending tongue 15 which is arcuate in cross-section as illustrated in Figure 5 in order to embrace spokes 8. Passing around the spoke 8 is a U-bolt 16 which is cushioned from the spoke by an insert 17 for presenting the spoke from being scratched or marred. The free ends of the U-bolt 16 are adapted to pass through a clamping plate 18 having apertured ears 19 through which is received the free ends of the U-bolt 16 and held in this fashion by nuts 20 threaded thereon whereby the U-bolt 16 will rigidly clamp the arcuately shaped tongue 15 of the ring 11 to the spoke as illustrated in Figures 1 and 2.

Figure 7:
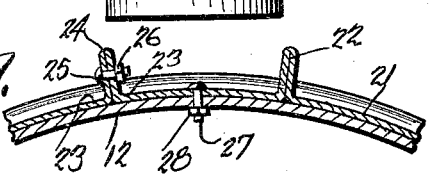
Figure 7 is a circumferential cross-sectional view taken on line 7—7 of Figure 6, illustrating the detachable traction increasing band and the manner in which it is carried by the felloe supporter rim.

The traction increasing element is in the form of a band 21 being bent at spaced intervals upon itself to form transversely extending traction increasing lugs 22. The free ends of the band as at 23 are provided with angular portions 24 to form a transversely extending traction increasing cleat and the angular ends 24 are secured in place by a bolt 25 and nut 26 whereby the band 21 will be tightened upon the angular extension 12 of the ring 11. To prevent the traction increasing band 21 from slippage upon the angular extension 12, bolt 27 may pass therethrough and be held in place by nuts 28 illustrated in Figure 7 in detail.

Having thus described the invention what is claimed is:—

A traction increasing device for pneumatically tired vehicle wheels having radial spokes, comprising a one-piece ring of angle formation in cross-section and having mounted on one wall thereof radial outwardly projecting traction teeth, the other wall of the ring flatly engaging a side of the wheel felly, radially arranged tongues integral with the inner edge of the last named wall of said ring and projecting inwardly therefrom, means for clamping the tongues to said spokes and the tongue carrying edge of said ring being formed with inturned portions between alternate pairs of spokes and embracing the felly of the wheel.

In testimony whereof I affix my signature.

ANTHONY ROZWORA.